United States Patent [19]

Miller

[11] Patent Number: 4,544,307

[45] Date of Patent: Oct. 1, 1985

[54] DRILLING JIG FOR FLATHEAD SCREW PILOT HOLES

[76] Inventor: Aaron B. Miller, P.O. Box 2378, Polson, Mont. 59860

[21] Appl. No.: 499,435

[22] Filed: May 31, 1983

[51] Int. Cl.$^4$ .............................................. B23B 49/02
[52] U.S. Cl. ............................... 408/72 B; 408/72 R; 408/97; 408/115 B
[58] Field of Search ........... 29/26 D; 408/72 R, 72 B, 408/112, 115 R, 115 B, 241.6, 97; 33/174 G

[56] References Cited

U.S. PATENT DOCUMENTS

| | | | |
|---|---|---|---|
| 568,932 | 10/1896 | Wilcox | 408/112 X |
| 1,831,813 | 11/1931 | Levedahl | 408/241 B |
| 2,335,614 | 11/1943 | Spievak | 408/112 X |
| 2,338,765 | 1/1944 | Hartman | 408/112 |
| 2,792,726 | 5/1957 | Vick | 408/112 X |
| 2,836,087 | 5/1958 | Ehresmann | 408/115 |
| 3,015,240 | 1/1962 | Hodnett | 408/112 X |

FOREIGN PATENT DOCUMENTS 594058 10/1947 United Kingdom .............. 408/72 B

OTHER PUBLICATIONS

"Practical Ideas", Hole-Finding Drill Jig, p. 85, American Machinist Aug. 24, 1970.

*Primary Examiner*—William R. Briggs

[57] ABSTRACT

In its preferred embodiment this jig is a rigid foam plastic casting specific to a particular type of workpiece. It enables accurate fastening of workpiece to external structure with flathead screws. Each such workpiece has a plurality of countersunk orifices of identical size and distribution pattern. Jig and workpiece are of general rectangular plan, the jig thick enough to allow for integral functional guide holes. Jig is fitted to workpiece and the associated two held against an external structure while pilot holes are drilled into the structure through the jig guide holes centered with respect to the workpiece orifices. Proper orientation of jig to workpiece is obtained and maintained by a plurality of truncated conical protuberances on the jig extending from one of its two major parallel surfaces. These protuberances are complementary in shape and distribution pattern to the countersunk orifices of the workpiece. When protuberances are severally and simultaneously fitted into orifices, that surface of the jig from which the protuberances extend will be juxtaposed and common to that surface of the workpiece exhibiting contersunk recesses. This insures proper orientation and inherent stability during drilling of pilot holes. Where the jig substance permits, grooves are provided to allow breaking cleanly into several parts, if desired, each part constituting one jig with one protuberance.

2 Claims, 3 Drawing Figures

DRILLING JIG FOR FLATHEAD SCREW PILOT HOLES

TECHNICAL FIELD

When flathead screws are used to attach workpieces to backings, extreme accuracy is necessary in the location and entry angle of the pilot holes, so that a jig would be indicated. For, as the heads of such screws are driven home into their countersunk orifices, the position assumed by the workpiece is irrevocably committed, with no compensating corrections possible. When the workpiece is a hinge, an almost imperceptible error in hinge position could be multiplied by the moment arm of door closure to result in a functional error at the latch side of the door.

This disclosure teaches a jig specific to a particular type of workpiece. It is suggested that one jig be packaged with a set of such workpieces. The jig is inexpensive enough to be discarded after a few instances of use. It is, however, inherently and invariably accurate in all respects, even when used by unskilled persons. Its primary appeal, therefore, is to the amateur or occasional carpenter. Details disclosed as the specification proceeds will amply prove that the jig performs as described above.

Prior patents over which this disclosure claims patentable departure include U.S. Pat. Nos. 568,932, 1,831,813, 2,355,614, 2,792,726, 2,836,087, 3,015,240; and British Pat. No. 594058.

594058 is directed at the removal of rivets. 283607 deals with the alignment of holes for dowels. The other patents cited above do provide for the centering of holes for flathead screws and for a slight degree of angular guidance of the drill bit. One or two provide for better angular guidance of the bit, but with additional complexity and additional moving parts. They all are designed for repeated use in heavy production carpentry and for the centering of drill bits through any sized countersink. Applicability to orifices of any size is an asset, but it usually entails a paucity of guidance in drill bit entry angle. All of these prior patents are for tools so costly as to be practicable only for professional carpenters who, incidentally, can better point a tool squarely into a work. Less skilled users of such tools would usually have no assurance of perpendicular entry of drill bit, since, with most of these tools, slight errors of hand could readily overwhelm the miniscule perpendicular guidance provided.

SUMMARY

The jig herein disclosed has no moving parts. It is specific to a particular workpiece and is cheap enough to be discarded after a few instances of use. A plurality of truncated conical protuberances on the jig fit snugly and simultaneously into the countersunk orifices of the workpiece, so that respective major surfaces of jig workpiece may be juxtaposed and in common, with no relative shearing motion possible.

Jig guide holes pass axially through protuberances and jig thickness, being thereby inherently centered with respect to their corresponding workpiece countersinks. A drill bit through such a guide hole must be inherently perpendicular to workpiece major surfaces.

BRIEF DESCRIPTION OF THE DRAWINGS

Three figures suffice. They are about actual size, except that the workpiece thickness is exaggerated for clarity.

DESCRIPTION OF THE PREFERRED EMBODIMENT

Figure 1:
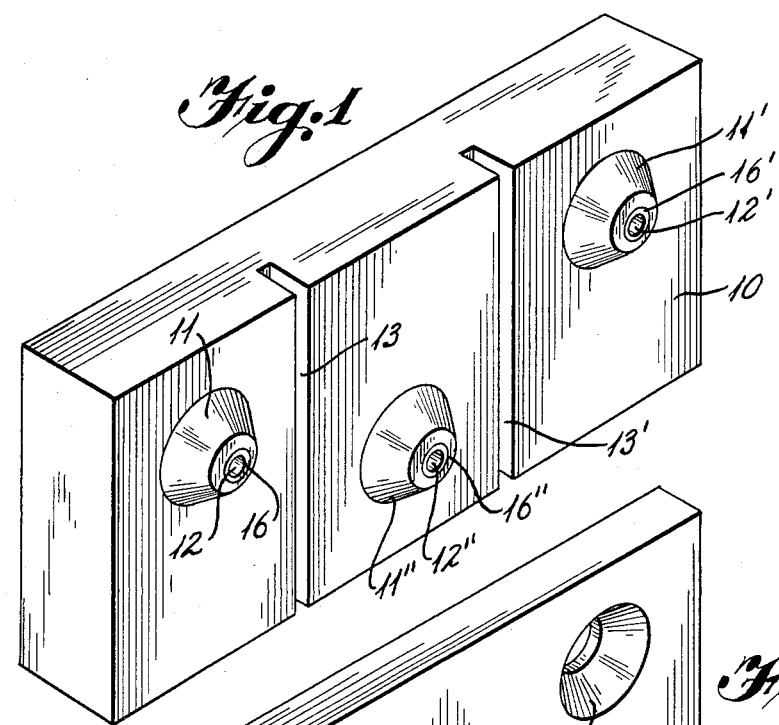
FIG. 1 is a cabinet projection of a jig, featuring that surface of the jig exhibiting protuberances and grooves.

In FIG. 1 a rigid, preferably foam plastic casting 10 constitutes the jig. Extending perpendicularly from a major surface of the jig 10 are a plurality of truncated conical protuberances 11, 11' etc. Guide holes 12, 12' etc. are centered through the protuberances 11, 11' etc. and extend through the remaining thickness of the jig 10.

Figure 2:
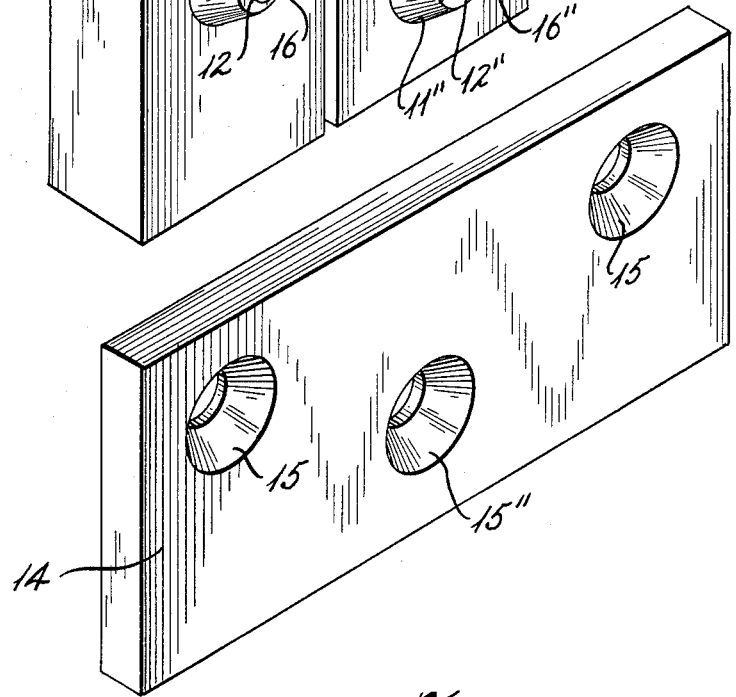
FIG. 2 is a cabinet projection of a workpiece particular to the jig of FIG. 1, featuring that surface of the workpiece exhibiting countersunk recesses.

In FIG. 2 a workpiece 14 specific to the jig 10 has countersunk orifices 15, 15' etc. complementary in shape and distribution pattern to the protuberances 11, 11' etc. of the jig 10.

Figure 3:
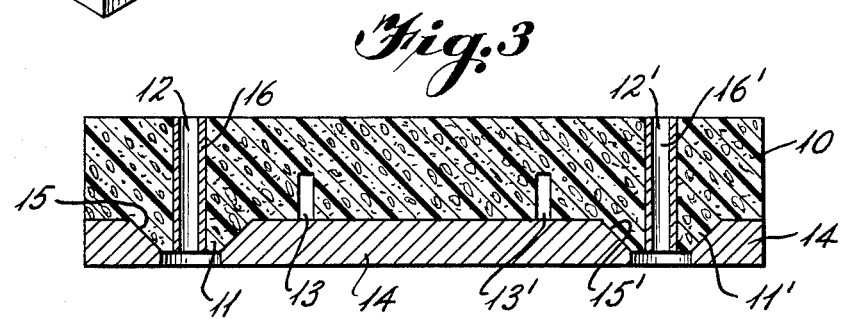
FIG. 3 is an orthographic elevation in cross section of the jig of FIG. 1 nested into the workpiece of FIG. 2 with the protuberances fitting into their respective orifices. The sectional cutting plane is that containing the axes of holes 12 and 12'. Therefore, items marked by a double prime do not appear in the Figure.

The user presses the jig 10 onto the workpiece 14 so that the protuberances 11, 11' of the jig 10 fit respectively into the corresponding countersunk orifices 15, 15' etc. of the workpiece 14, as shown in cross section in FIG. 3. When so fitted, that surface of the jig 10 from which protuberances extend will be juxtaposed and common to that surface of the workpiece exhibiting countersinks. The guide holes 12, 12' etc. will be therefore inherently centered with respect to their corresponding orifices 15, 15' etc. and perpendicular to the facing surface of the workpiece 14. Since the rectangular workpiece 14 has parallel major surfaces, a drill bit through any guide hole 12 will be perpendicular to the external structure against which the association of jig 10 and workpiece 14 is held.

With the association of jig and workpiece so held, in correct location, workpiece 14 contacting the backing structure, the user inserts a drill bit not turning into one of the guide holes 12 until it reaches the backing structure. The drill is then powered and a pilot hole drilled into the backing structure. Still holding associated jig and workpiece to backing structure, additional pilot holes are similarly drilled through the other guide holes 12.

The jig 10 is then removed and the workpiece 14 is fastened to its backing structure with flathead screws. As the screwheads are driven into the countersinks the workpiece 14 will perforce assume the correct location.

Unless the jig 10 be composed of hardened steel, it may be necessary, even in a disposable jig, to line the holes 12 with optional thin metallic liners 16.

FIG. 1 shows optional grooves 13, 13'. If the jig 10 be made of material such as rigid foam plastic, which can be broken cleanly, the grooves 13 facilitate such clean breaking or cutting of the jig 10 into several parts. Each such part can act as an individual jig having one protuberance and sufficient main surface for perpendicular orientation of the guide hole when such individual jig is juxtaposed against a workpiece having countersunk orifices of suitable shape in any distribution pattern.

Accordingly I claim:

1. A drilling jig for alignment of drilled pilot holes relative to a workpiece having a pattern of bevelled countersunk recesses that receive flathead screws, said drilling jig comprising: an elongate generally rectangular plate having generally parallel upper and lower surfaces; said lower surface having a plurality of truncated conical protuberances arranged in said pattern and extending from said lower surface to be received simultaneously in the countersunk recesses of the workpiece; said plurality of protuberances each having a cross section complementary in shape to the cross section of the countersunk recesses so that said lower surface is juxtaposed with the workpiece surface when the drill jig is positioned thereon; and a plurality of through holes, corresponding to said plurality of protuberances, extending perpendicularly to said upper and lower surfaces, each hole being centered relative to a corresponding protuberance.

2. A drilling jig according to claim 1 wherein said plate is formed with a groove or grooves in one of said surfaces, said groove or grooves being positioned between said protuberances to allow facile cutting or breaking of said jig into a plurality of parts each having a protuberance thereon to constitute an individual drill jig.

* * * * *